May 29, 1951  R. L. DAVIES  2,554,900
ATTACHMENT FOR TRACTORS
Filed May 15, 1947  2 Sheets-Sheet 1

Inventor
Rhoslyn L. Davies
By Clarence A. O'Brien
and Harvey B. Jacobson
Attorneys May 29, 1951          R. L. DAVIES          2,554,900

ATTACHMENT FOR TRACTORS

Filed May 15, 1947          2 Sheets-Sheet 2

Inventor
Rhoslyn L. Davies

By *Clarence A. O'Brien and Harvey B. Jacobson*
Attorneys

Patented May 29, 1951

2,554,900

UNITED STATES PATENT OFFICE 2,554,900

ATTACHMENT FOR TRACTORS

Rhoslyn L. Davies, Willard, Ohio

Application May 15, 1947, Serial No. 748,239

2 Claims. (Cl. 212—8)

This invention relates to new and useful improvements in attachments for tractors and the primary object of the present invention is to provide a hoisting device for tractors and the like which may be quickly and readily applied to the lifting mechanism of a tractor.

Another important object of the present invention is to provide a collapsible hoisting mechanism which may be conveniently packed in relatively small containers for shipment or storage of the same.

A further object of the present invention is to provide an attachment for tractors which is useful in lifting great loads to be hauled by the tractor.

A still further aim of the present invention is to provide a hoisting device for tractors which is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
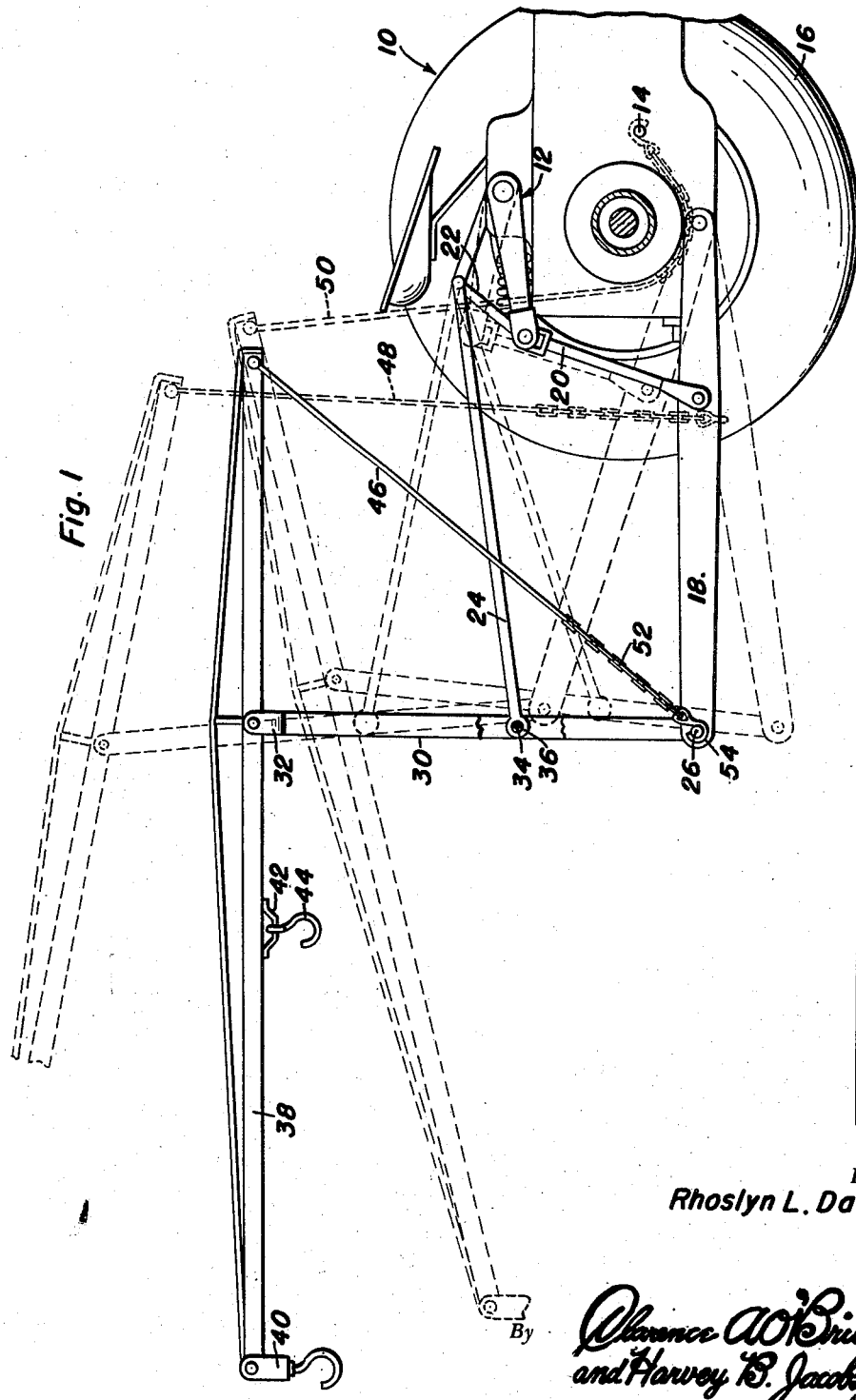
Figure 1 is a fragmentary side elevational view of a tractor showing the present invention applied thereto, and with dotted lines showing the various raised and lowered positions of the hoisting mechanism.
Figure 2:
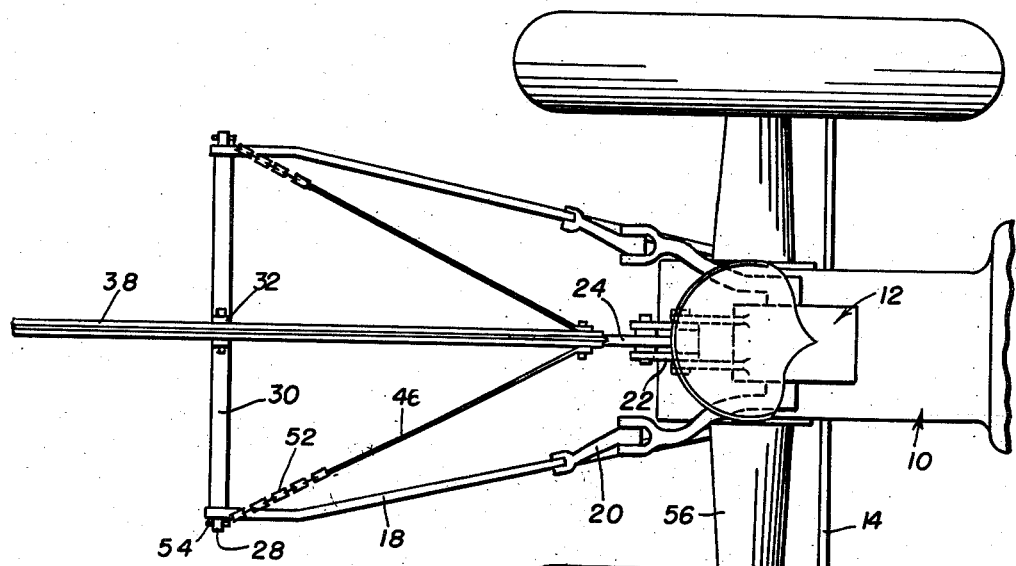
Figure 2 is a fragmentary top plan view of Figure 1.
Figure 3:
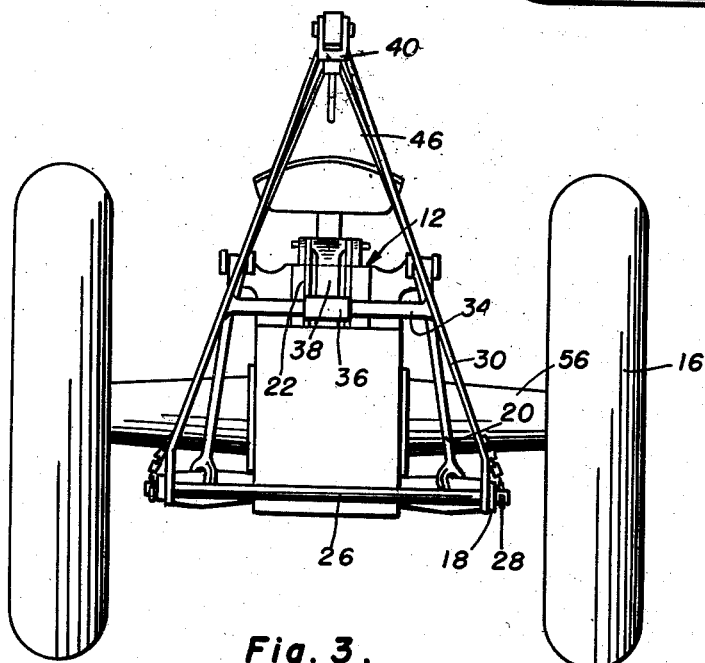
Figure 3 is a rear elevational view of a tractor, the present invention applied thereto in a normal position.

Referring now to the drawings in detail, wherein for the purpose of illustration, there is disclosed a preferred embodiment of the present invention, the numeral 10 represents generally a conventional tractor including a hydraulic lift mechanism 12, brake rod 14, and rear wheels 16.

Pivotally mounted on the tractor at each side thereof is a lower link 18, which is connected by an arm 20 to the hydraulic lift mechanism 12, for the raising of the link by the raising of said mechanism.

The present invention does not attempt to claim the foregoing conventional structure, but merely is an attachment therefor.

Connected to the rear of the tractor by arms or brackets 22, is an upper link 24, that supports in an upright position the frame work which is to be later described.

The outer free ends of the lower links 18 are connected by a cross bar 26, the terminal portions 28 of which, project outwardly from the ends of the links 18 for a purpose which will later be described.

Suitably secured to the cross bar 26 are the lower ends of a pair of connecting bars 30, whose upper ends converge and receive a substantially U-shaped coupling member 32.

Extending transversely between bars 30 at substantially the center thereof, is a cross brace 34 on which is journaled a sleeve 36 carried by the free outer end of the upper link 24.

Pivotally mounted in member 32 is a boom 38, carrying a pivotal hook element 40 at its outer end and a bracket 42 supporting a second hook 44 at substantially the center of the boom.

Suitably mounted to the inner end of boom 38 are the ends of a pair of guy lines 46. The lower free ends of this pair of guy lines are suitably secured to chains 52 provided with hooks 54 at their free ends.

In practical use of the device, guy lines 46 are either extended rearwardly so that the hook 54 may engage the terminal portions 28 of the cross bars 26; extended so that the hooks carried thereby engage the lower links 18 at substantially the center thereof, as shown by dotted lines 48, or the lines may be extended forwardly so that the chains 52 embrace the tractor wheel axle 56, and the hooks carried by these chains engage the brake rods 14 for anchoring one end of the boom thereto, as shown by dotted lines 50.

These guy wires prevent material lateral movement of the end of the boom and hold it stationary or regulate its rise according to the anchorage point selected for the hooks.

When the lifting mechanism is operating, the link 24 is raised and also raises connecting bars 30 vertically. The vertical raising of these connecting bars is also aided by the pushing effect due to the links 18 being connected to the lifting mechanism for raising thereof simultaneously with link 24.

The guy rods 46 being anchored to rod 14 permits the boom to pivot upwardly at its forward end preventing transverse movement of the boom relative to the connecting bars 30, and the stabilizing bar 24 prevents longitudinal movement of the boom.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An attachment for tractors having hydraulic lift mechanisms, said attachment comprising a pair of lower links pivoted to a tractor, means securing said links to the lift mechanism of a tractor, a cross bar joining the lower links, connecting bars pivoted to and rising from the cross bar, means connecting the connecting bars to the lift mechanism of a tractor, a boom pivoted intermediate its ends to said connecting bars, said boom having a forward end, and a plurality of flexible elements carried by the forward end of said boom for selectively engaging said cross bar and said lower links to retain the boom pivoted relative to said connecting bars.

2. In a tractor having a hydraulic lift mechanism and a brake rod at the rear end of the tractor; a lifting device comprising a pair of lower links having inner end portions pivoted to the rear of the tractor and adjacent the brake rod, a cross rod joining the outer ends of said lower links, connecting bars pivoted on and rising from the cross rod, means connecting the lower links to the lift mechanism for raising and lowering the lower links and the connecting bars by the lift mechanism, further means connecting the bars to the lift mechanism and bracing the connecting bars to the tractor, a lifting boom having forward and rear portions, means pivotally securing the connecting bars to the boom adjacent the rear portion of the latter, a pair of elongated flexible elements secured to the rear portion of said boom, and hooks carried by the flexible elements for selectively engaging said cross rod, said lower links and said brake rod to retain the boom pivoted at a selected angle relative to said connecting bars, said further means comprising an upper link spaced substantially parallel to said lower links during raising and lowering of said lower links, said upper link retaining said connecting bars substantially vertical during raising and lowering of said lower links.

RHOSLYN L. DAVIES.

REFERENCES CITED

The following references are of record in the file of this patent:

UNITED STATES PATENTS

| Number | Name | Date |
| --- | --- | --- |
| 1,509,905 | Salyards et al. | Sept. 30, 1924 |
| 2,398,585 | Hayward | Apr. 16, 1946 |
| 2,433,019 | Arps | Dec. 23, 1947 |